United States Patent [19]

Mochinaga et al.

[11] Patent Number: 4,751,741
[45] Date of Patent: Jun. 14, 1988

[54] PEN-TYPE CHARACTER RECOGNITION APPARATUS

[75] Inventors: Nobuyuki Mochinaga; Takashi Moto; Yoshio Ogata, all of Tokyo, Japan

[73] Assignee: Casio Computer Co., Ltd., Tokyo, Japan

[21] Appl. No.: 754,394

[22] Filed: Jul. 11, 1985

[30] Foreign Application Priority Data

Jul. 19, 1984 [JP] Japan ................... 59-150209
Jul. 19, 1984 [JP] Japan ................... 59-150208
Sep. 14, 1984 [JP] Japan ................ 59-138674[U]
Sep. 19, 1984 [JP] Japan ................ 59-141825[U]

[51] Int. Cl.$^4$ ............................................. G06K 9/00
[52] U.S. Cl. ............................................. 382/13; 178/18
[58] Field of Search ................ 382/13, 59; 364/705; 178/18; 340/706

[56] References Cited

U.S. PATENT DOCUMENTS

| | | | |
|---|---|---|---|
| 3,487,371 | 12/1969 | Frank | 382/13 |
| 4,070,649 | 1/1978 | Wright, Jr. et al. | 382/13 |
| 4,128,829 | 12/1978 | Herbst et al. | 382/3 |
| 4,141,073 | 2/1979 | Tan | 382/13 |
| 4,142,175 | 2/1979 | Herbst et al. | 382/59 |
| 4,241,409 | 12/1980 | Nolf | 382/13 |

FOREIGN PATENT DOCUMENTS

| | | | |
|---|---|---|---|
| 097807 | 1/1984 | European Pat. Off. | 382/13 |
| 107196 | 5/1984 | European Pat. Off. | 382/13 |
| 2855863 | 7/1979 | Fed. Rep. of Germany | 382/13 |
| 916408 | 1/1963 | United Kingdom | 382/13 |
| 1463887 | 2/1977 | United Kingdom | 382/13 |
| 1516220 | 6/1978 | United Kingdom | 382/13 |

Primary Examiner—David K. Moore
Assistant Examiner—Jacqueline Todd
Attorney, Agent, or Firm—Frishauf, Holtz, Goodman & Woodward

[57] ABSTRACT

A pen-type character recognition apparatus includes an input data detecting section for detecting input character data as data representing a certain character according to a change in pressure applied to a tip element of a pen. A data processing section standardizes the output data from the input data detecting section by compressing the output data to a predetermined number of data for the character, so as to generate corresponding standardized data. A data registering section registers in advance selected standardized data as standard pattern data for corresponding to the predetermined input character data when a character is written with the pen tip element, and an input character recognizing section recognizes the character represented by the input character data by comparing the standardized data generated from the data processing section with the data registered in advance in the data registering section.

9 Claims, 17 Drawing Sheets

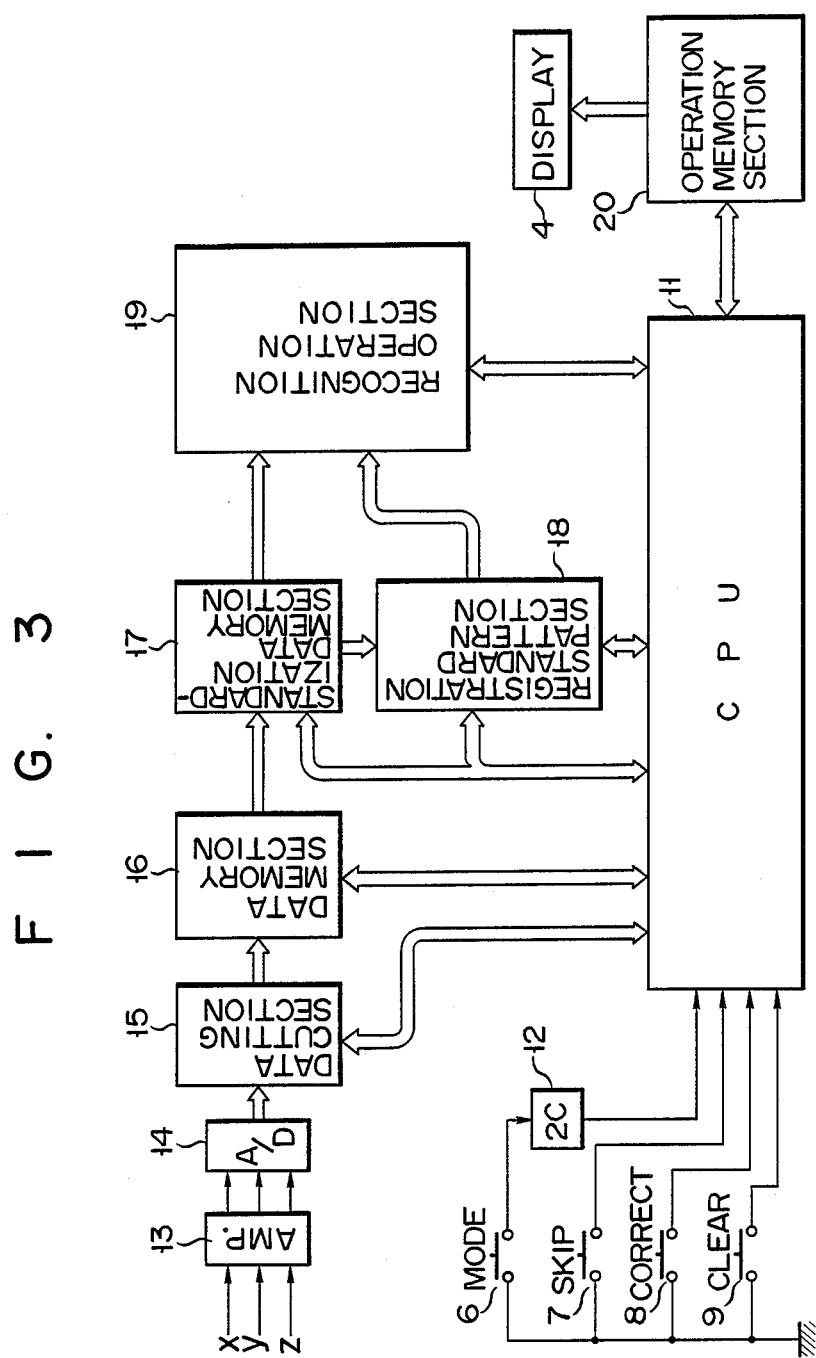

FIG. 10

| | INPUT CHARACTER | Ci | DISPLAY |
|---|---|---|---|
| (1) | 1 | 1 | 1 |
| (2) | 2 | 2 | 12 |
| (3) | + | 11 | + 12 |
| (4) | 3 | 8 | 8 |
| (5) | CORRECT | 3 | 3 |
| (6) | 4 | 4 | 34 |
| (7) | = | 15 | 46 |
| (8) | CLEAR | 0 | 0 |

PEN-TYPE CHARACTER RECOGNITION APPARATUS

BACKGROUND OF THE INVENTION

The present invention relates to a pen-type character recognition apparatus and, more particularly, to a pen-type character recognition apparatus which can recognize an input character upon the detection of the direction of a pressure acting on a tip element in accordance with an operation of handwriting a character and the like by a pen.

Recently, a pen-type character recognition apparatus which recognizes handwriting input character data, upon detection of the pressure and the direction of the pressure acting on a tip element in accordance with an operation of handwriting a character by a pen, has been proposed.

However in the apparatus of this type, since standard fonts of characters to be inputted are predetermined, the apparatus cannot sufficiently cope with personal differences in writing characters, resulting in a poor response due to the above drawbacks.

SUMMARY OF THE INVENTION

It is, therefore, an object of the present invention to provide a new and improved pen-type character recognition apparatus which can recognize handwritten characters even when they have different fonts and can be used in practice.

It is another object of the present invention to provide a pen-type character recognition apparatus which can precisely perform the data cutting operation of input characters.

It is still another object of the present invention to provide a pen-type character recognition apparatus which can easily correct an erroneously input character without requiring the reinputting of the character when the input character is erroneously recognized.

It is still another object of the present invention to provide a pen-type character recognition apparatus comprising an amplifier which can precisely amplify a pen input detection signal even when the detection signal is changed from an initial level over time or when an offset phenomenon occurs in the amplifier itself.

It is still another object of the present invention to provide a pen-type character recognition apparatus which comprises a piezoelectric element of a semiconductor strain gauge having a small output variation and high detection precision.

According to the present invention, a pen-type character recognition apparatus comprises:

input data detecting means for detecting predetermined input character data as input data every one character in accordance with a change in pressure applied to the tip element of a pen;

data processing means for standardizing the output data from said input data detecting means by compressing the output data to a predetermined number of data every one character so as to generate standardized data;

data registering means for registering in advance one of, the preset standard pattern data corresponding to the predetermined input character data, or, the output data from said data processing means corresponding thereto; and input character recognizing means for recognizing the input character data by comparing the output data generated from said input data processing means and the data registered in said data registering means in advance.

BRIEF DESCRIPTION OF THE DRAWINGS

These and other objects and features of the present invention can be understood by reference to the accompanying drawings, in which:

FIG. 3 is a block diagram showing the overall arrangement of an internal electronic circuit of FIG. 1;

FIG. 10 is a view showing the relationship between the input character and the recognition result thereof for explaining a correction operation of the first embodiment;

DETAILED DESCRIPTION OF THE PREFERRED EMBODIMENTS

Figure 1:
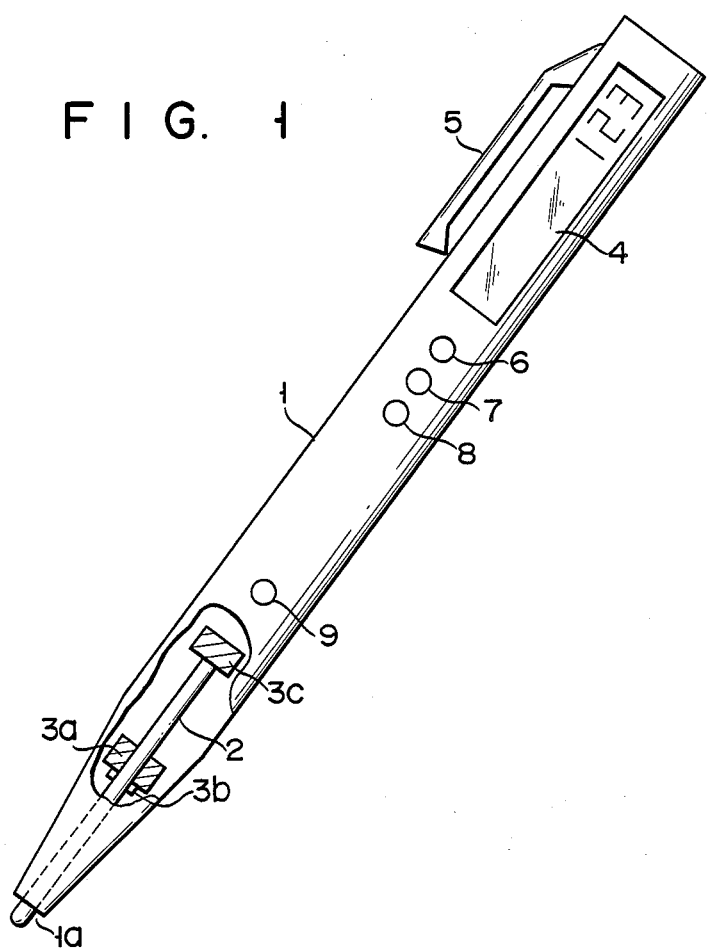
FIG. 1 is a partial, sectional view of a writing tool casing of a pen-type character recognition apparatus according to a first embodiment of the present invention.

A first embodiment of the present invention will be described. FIG. 1 is a view showing an arrangement using a ballpoint pen as a writing tool including a writing tool casing 1. In the casing 1, a ballpoint pen tip element 2 is swingably supported by piezoelectric elements, e.g., semiconductor strain gauges (to be referred to as strain gauges hereinafter) 3a, 3b and 3c for generating an electric signal in accordance with a detected pressure. A central portion of the tip element 2 is supported by the strain gauges 3a and 3b, and a base portion thereof is supported by the strain gauge 3c. The strain gauges 3a and 3b detect a pressure applied in the x and y directions perpendicular to the axial direction of the tip element 2, and the strain gauge 3c provided on the base portion of the element 2 detects a pressure applied in the axial direction thereof, i.e., the z direction. An ink reservoir of the tip element 2 comprises an insulating member and a distal end thereof externally extends from a through hole 1a formed at a distal end of the casing 1. A display section 4 is formed in the outer surface of the casing along the longitudinal direction thereof, and a clip 5 is provided thereon. Furthermore, a mode key 6 for switching a standard pattern registration mode and a recognition mode, a skip key 7, a correction key 8 for correcting an input character, and a clear key 9 for clearing an input content are provided on the outer surface of the casing 1. The strain gauges 3a, 3b and 3c, the display section 4 and the keys 6, 7, 8 and 9 are connected to an electric circuit provided in the casing 1.

Figure 2:
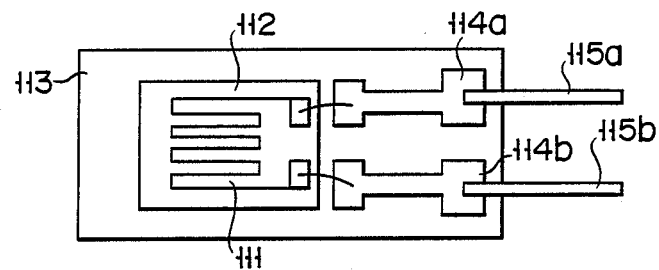
FIG. 2 is a view showing an arrangement of a semiconductor strain gauge used as a piezoelectric element in a pen-type character recognition apparatus of the first embodiment.

FIG. 2 is a view showing the diffusion resistor used in each semiconductor strain gauge. A semiconductor chip 112 on which a diffusion resistor 111 formed in a comb shape, is adhered to a base substrate 113. Two end portions of the diffusion resistor 111 are connected to lead wires 115a and 115b through electrode portions 114a and 114b formed on the base substrate 113. The lateral direction, i.e., the longitudinal direction of the diffusion resistor 111 corresponds to a pressure sensitive direction. When a strain occurs in the pressure sensitive direction, an output signal is generated from the lead wires 115a and 115b due to a piezoelectric resistance change of the diffusion resistor 111.

In particular, the semiconductor strain gauge consists of a small chip. The small chip is formed by cutting a monocrystalline silicon having a proper impurity concentration along a crystallographic axis. Since the semiconductor strain gauge has a piezoelectric resistance effect in accordance with an anisotropy of the crystal, sensitivity (gauge rate) is several tens of times that of the metal resistive wire strain gauge. In addition, the semiconductor strain gauge can provide a negative sensitivity, i.e., a decrease in a resistance with respect to extension not obtainable with the metal resistive wire strain gauge.

FIG. 3 is the electric circuit provided in the casing 1 of FIG. 1. Referring to FIG. 3, a CPU 11 receives operation signals from the keys 6, 7, 8 and 9. In this case, the operation signal of the mode key 6 is supplied to the CPU 11 through a binary counter 12. DC amplifier 13 receives signals from the strain gauges 3a, 3b and 3c. The output from the DC amplifier 13 corresponding to the strain gauges 3a, 3b and 3c is converted into digital data by an A/D converter 14, and thereafter, the digital data is supplied to a data cutting section 15. The data cutting section 15 cuts a waveform of an input signal in accordance with a control instruction from the CPU 11, and stores cutting data in a data memory section 16, and thereafter, transfers the data to a standardization data memory section 17. The section 17 supplies storage data to a registration standard pattern section 18 in a pattern registering mode in accordance with an instruction from the CPU 11, and supplies the storage data to a recognition operation section 19 in a recognizing mode. The section 18 stores various standard patterns corresponding to, e.g., letters, numerals, symbols and the like and stroke numbers required for handwriting them, and supplies the storage data to the section 19. The section 19 compares the data written in the section 17 with the standard pattern stored in the section 18 so as to recognize input character data, and supplies the recognition result to the CPU 11. The CPU 11 supplies the recognition result from the section 19 to an operation memory section 20, and causes the display section 4 to display it. In this case, if the recognized characters include function symbols, the CPU 11 causes the section 20 to perform the calculation and causes the section 4 to display the calculation result.

Figure 4:
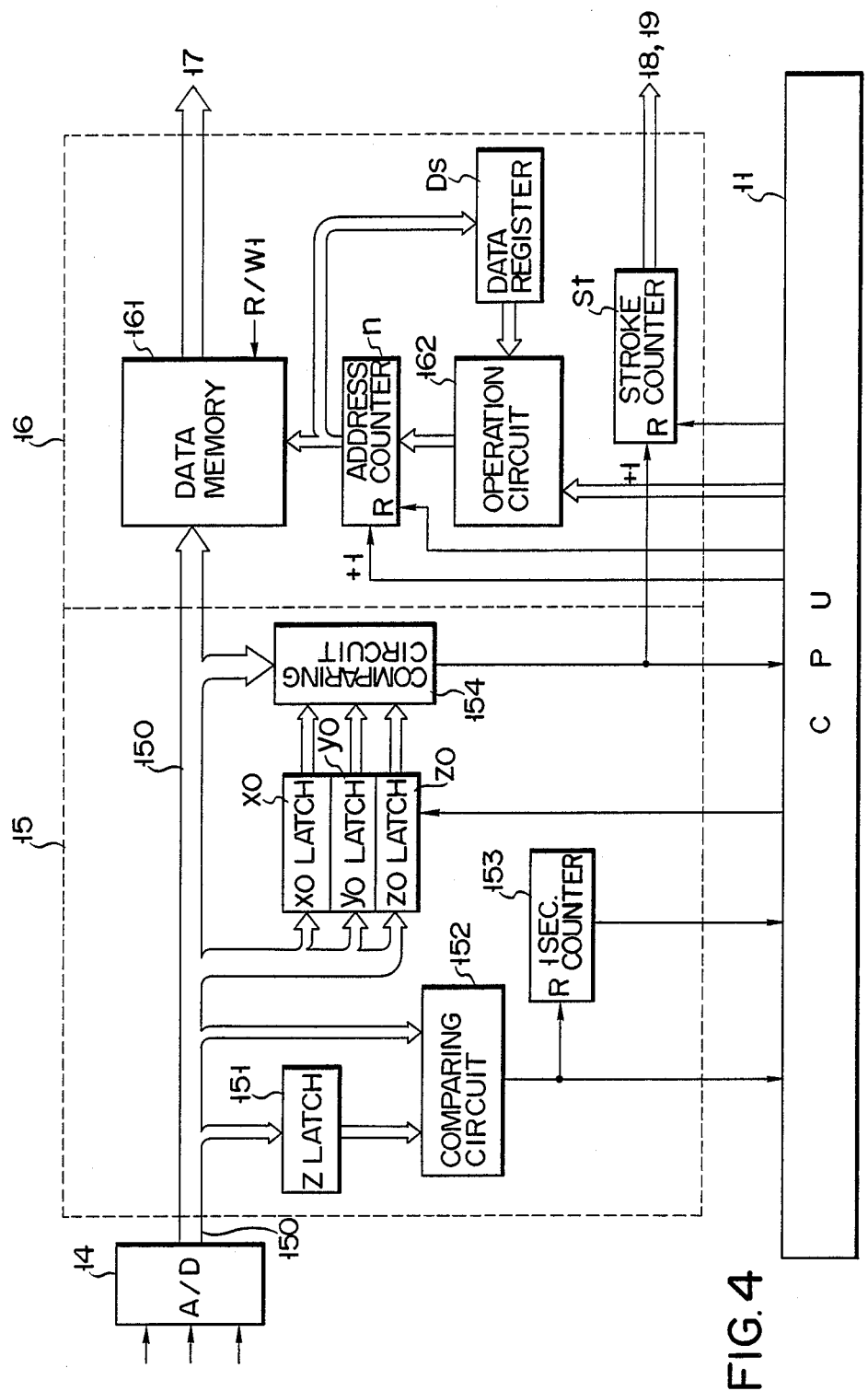
FIG. 4 is a block diagram showing a data cutting section and a data memory section of FIG. 3 in more detail.

The above-mentioned sections will be described in more detail. FIG. 4 shows the data cutting section 15 and the data memory section 16 in detail. When data is supplied from the A/D converter 14 to the data cutting section 15 through a bus line 150, the input data is supplied to a comparing circuit 152 directly and through a z latch 151. When the two input data coincide with each other, the circuit 152 generates a "0" signal, and otherwise, generates a "1" signal. The output signal from the circuit 152 is supplied to the CPU 11 and a 1-sec counter 153. The counter 153 is reset when the circuit 152 generates the "1" signal, and performs counting while the output from the circuit 152 is kept to be "0". Every time one second has passed, the counter 153 generates a count signal to the CPU 11. The data supplied from the A/D converter 14 is also supplied to an x-zero-point latch x0, a y-zero-point latch y0 and a z-zero-point latch z0. The latches x0, y0 and z0 latch the data from the A/D converter 14 in synchronism with a timing signal from the CPU 11, and supply the data to a comparing circuit 154. The circuit 154 compares the data latched in the latches x0, y0 and z0 with the data from the converter 14. When a coincidence between the input data is established, the circuit 154 generates a "0" signal, and otherwise, generates a "1" signal. The output signal from the circuit 154 is supplied to the CPU 11 and is supplied to a stroke counter St of the data memory section 16 as a count-up signal. Additionally, the stroke counter St is reset by a signal from the CPU 11, and the count data thereof is supplied to the sections 18 and 19. The section 16 comprises a data memory 161 which receives the data supplied from the converter 14 through the bus line 150 in the section 15. An address in the data memory 161 is designated by an address counter n, and the memory 161 receives a read/write instruction R/W1 from the CPU 11. The data stored in the section 16 is transferred to the section 17. The counter n receives a reset signal and a "+1" signal from the CPU 11, and initial data is set in the counter n by an operation circuit 162. The count data from the counter n is supplied to the memory 161, as described above, and is supplied to a data register Ds. The register Ds stores the number of data, and a storage content thereof is supplied to the circuit 162. Furthermore, the circuit 162 receives numeral data from the CPU 11.

Figure 5:
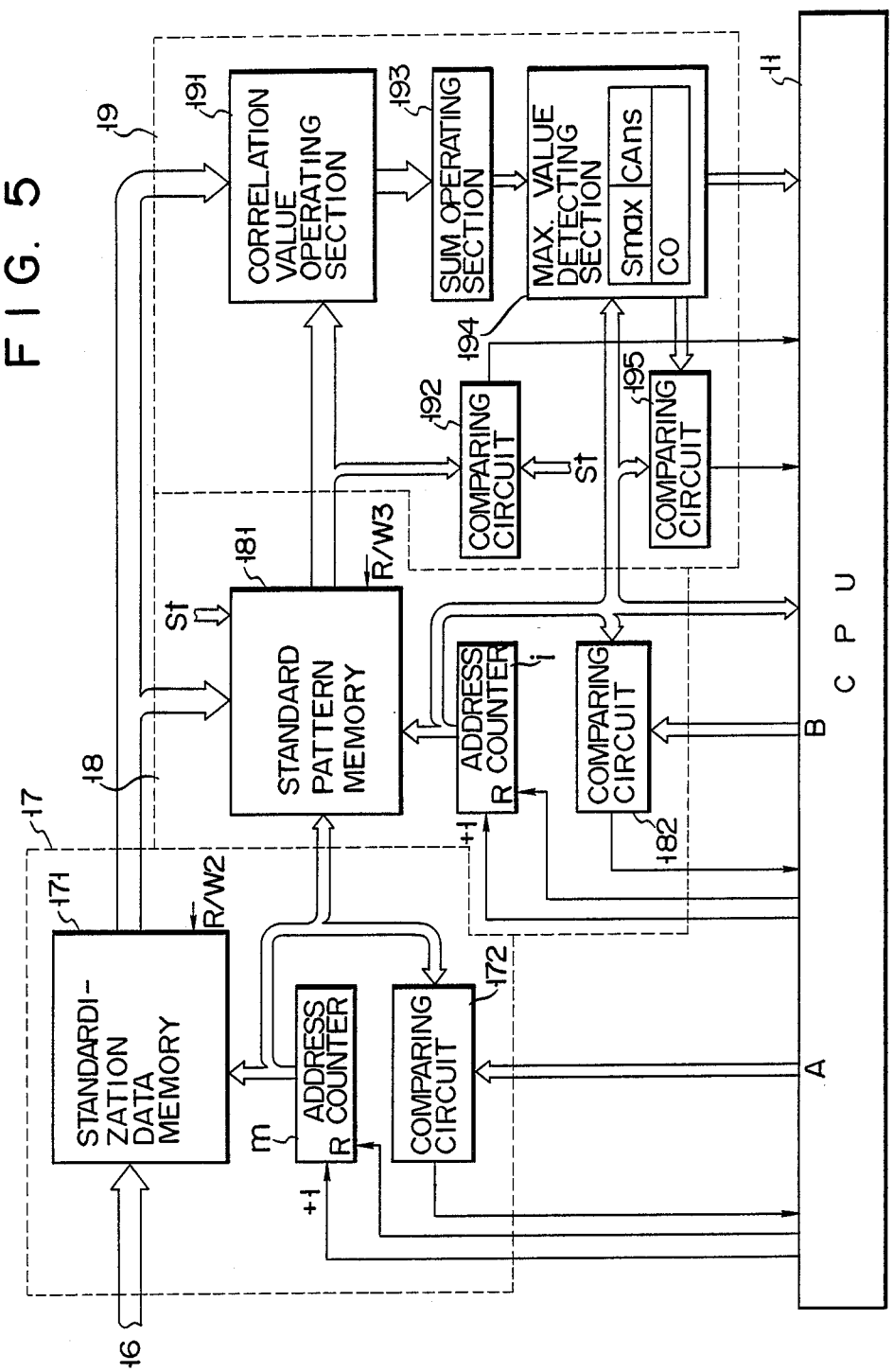
FIG. 5 is a block diagram showing a standardization data memory section, a registration standard pattern section and a recognition operation section in FIG. 3 in more detail.

FIG. 5 shows the standardization data memory section 17, the registration standard pattern section 18, and the recognition operation section 19 in detail. The section 17 comprises a standardization data memory 171 which stores the data supplied from the data memory 161. An address in the memory 171 is designated by an address counter m, and the memory 171 receives a read/write instruction R/W2 from the CPU 11. The address counter m receives a reset signal and a "+1" signal from the CPU 11, and supplies a count content thereof to the memory 171 and to a comparing circuit 172. The circuit 172 compares the count data from the counter m and a constant A supplied from the CPU 11, and supplies the comparison result to the CPU 11. The constant A is set to be, e.g., "12". Thus, the storage data in the memory 171 is supplied to a standard pattern memory 181 in the section 18 together with the count data of the stroke counter St in the section 16. An address of the memory 181 is designated by the address counter m and an address counter i, and the memory 181 receives a read/write instruction R/W3 from the CPU 11. The counter i receives a reset signal and a "+1" signal from the CPU 11, and supplies the count data thereof to a comparing circuit 182 and to the CPU 11. The circuit 182 compares the count data from the counter i and a constant B from the CPU 11, and supplies the comparison result to the CPU 11. The constant B is set to be, e.g., "15". The storage data in the memory 181 is supplied to the section 19, and is received by a correlation value operating section 191 and a comparing circuit 192. The circuit 192 also receives the count data of the stroke counter St in the section 16. The circuit 192 detects coincidence between two input data, and supplies the comparison result to the CPU 11. The section 191 receives data held in the memory 171. The section 191 calculates a correlation value between data x, y and z held in the memory 171 and the standard pattern stored in the memory 181, and supplies the operation result to a sum operation section 193. The section 193 adds the correlation values corresponding to signals x, y and z obtained by the section 191 to each other, and supplies the sum data to a maximum value detecting section 194. The section 194 also receives the output from the counter i in the section 18. The section 194 comprises a maximum value register Smax, an answer register Cans and a recognition result holding register Co. The section 194 detects a maximum value from the correlation values supplied from the section 193 and writes the maximum value in the register Smax and an i value of the maximum value in the registers Cans and Co. The data written in the register Co is transferred to a comparing circuit 195. The circuit 195 receives the count content of the counter i. The circuit 195 checks if the count data of the counter i is included in the data held in the register Co, and supplies the check result to the CPU 11. The data held in the register Cans in the section 194 is supplied to the CPU 11 as the input character recognition result. The CPU supplies the recognition result from the section 194 to the operation memory section 20 shown in FIG. 3, thereby displaying it on the display section 4.

Figure 6:
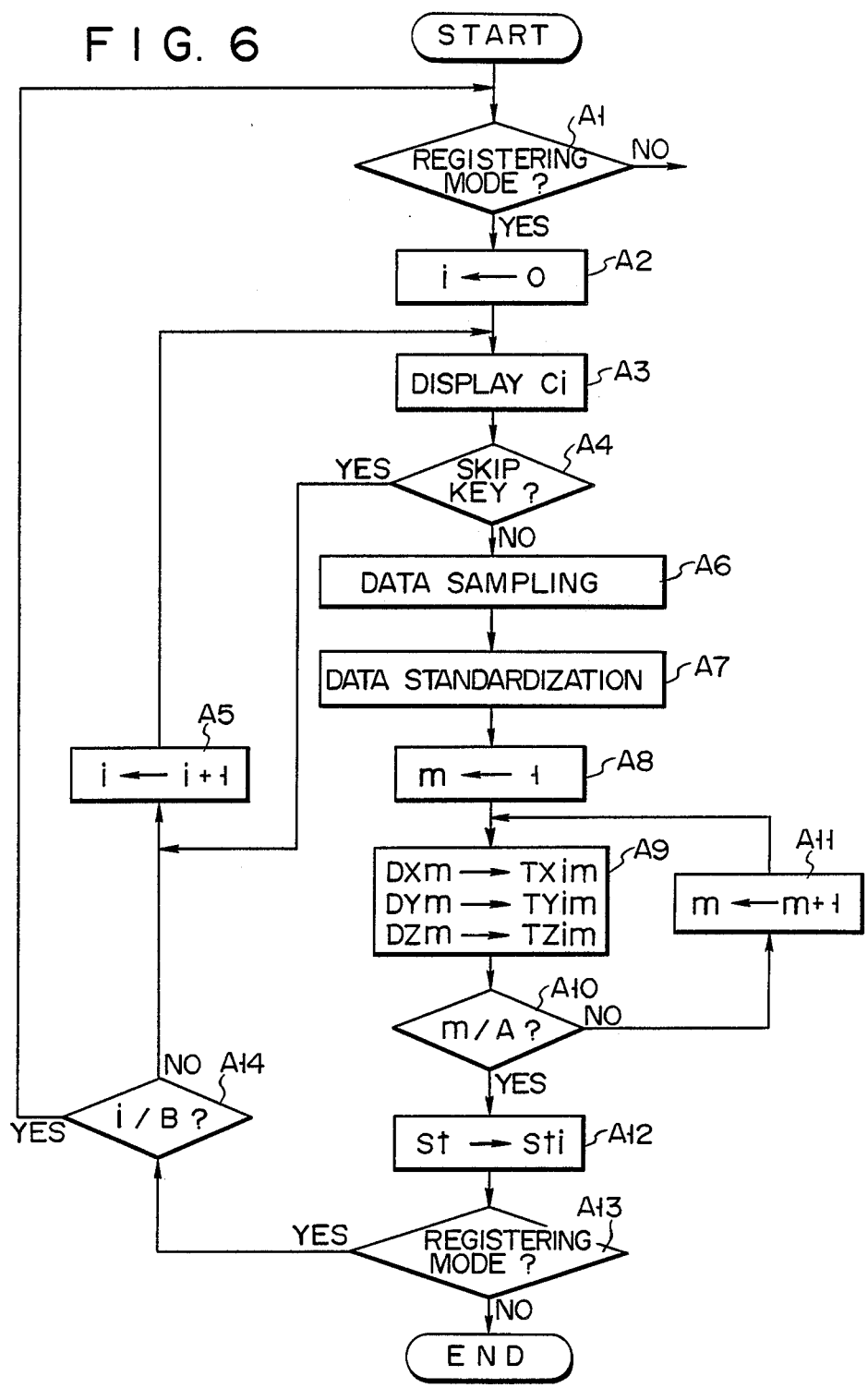
FIG. 6 is a flow chart showing a registering operation of a standard pattern of the first embodiment.

The operation of the above embodiment will be described with reference to flow charts of FIGS. 6 to 9. The standard patterns are stored in the memory 181 in the section 18 in advance. However, some users are poor handwriters and the input characters differ from the standard patterns, so that identification of the input characters is not performed. In this case, the input character patterns of a particular user are registered in the section 18 as standard patterns prior to character recognition. When the standard patterns are registered, the content of the counter 12 is incremented to "1" by operating the mode key 6 shown in FIG. 1, thus designating the pattern registering mode. The flow chart shown in FIG. 6 shows the registration operation of the standard patterns. When the standard pattern registering mode is designated by the mode key 6, the CPU 11 detects from the content of the counter 12 in step A1 that the registering mode is designated. Then, the flow advances to step A2, and the counter i in the section 18 is reset. The CPU 11 generates a signal for displaying letters and symbols corresponding to a count content $C_i$ of the counter i in step A3. In this case, contents $C_0$ to $C_9$ correspond to numerals "0" to "9", a content $C_{10}$ corresponds to a decimal point ".", and contents $C_{11}$ to $C_{15}$ correspond to function symbols "+", "−", "×", "÷" and "=". Therefore, when the counter i is reset and the content $C_i$ is "0", the CPU 11 supplies the numeral "0" to the section 20 and causes the section 4 to display it. In this case, when a character pattern "0" is to be registered, the user handwrites the numeral "0" with the ballpoint pen shown in FIG. 1. When this pattern is not to be registered, the user operates the skip key 7. The CPU 11 checks in step A4 if the key 7 is depressed. If YES in step A4, the CPU 11 generates the "+1" signal to the counter i so as to increment the count content thereof by one in step A5. Thereafter, the flow returns to step A3, and the CPU 11 causes the section 4 to display the character pattern corresponding to the content $C_i$. In this case, since the content $C_i$ is "1", the numeral "1" is displayed on the section 4. Every time the key 7 is depressed, the content of the counter i is sequentially counted up, and the character pattern corresponding to the count data is displayed on the section 4. Therefore, when the desired character pattern is displayed on the section 4, the user handwrites this character so as to input it. When the character pattern is handwritten, the flow advances from step A4 to step A6, and the input data is sampled. In step A7, the input data is standardized. The sampling processing in step A6 and the standardization processing in step A7 will be described later in more detail. Thus, after step A7, the flow advances to step A8, and "1" is written in the counter m in the section 17. In step A9, the standardization data $DX_m$, $DY_m$ and $DZ_m$ stored in the memory 171 are written in the memory 181 as standard pattern data $TX_{im}$, $TY_{im}$ and $TZ_{im}$. The addresses of the memory 181 are designated by the counter m. The flow then advances to step A10, and it is checked from the comparison result of the circuit 172 if the count data of the counter m is incremented to the constant A (=12) supplied from the CPU 11. If NO in step A10, the flow advances to step A11, and the content of the counter m is incremented by one. Thereafter, the flow returns to step A9. The same operation is repeated until the count of the counter m reaches the constant A, and the standardization data stored in the memory 171 is written in the memory 181. When the count of the counter m reaches the constant A, since YES in step A10, the flow advances to step A12. In step A12, the stroke number held in the counter St is transferred to the memory 181, and is written at the address designated by the counter i. In this case, the count of the counter m is "0". Thereafter, the flow advances to step A13, and it is checked if the registering mode is designated. If NO in step A13, the pattern registration operation is completed. However, if YES in step A13, the flow advances to step A14. It is checked from the comparison result of the circuit 182 in step A14 if the count of the counter i has reached the constant B (=15) supplied from the CPU 11. If NO in step A14, the content of the counter i is incremented by one in step A5 and thereafter the flow returns to step A3. The same operation as described above is repeated. If it is detected in step A14 that the content of the counter i has reached the constant B, i.e., if YES in step A14, the flow returns to step A1, and it is checked if the registering mode is still designated. In this case, if the registering mode is cleared, the routine enters into the character recognition processing to be described later.

The data sampling processing (including data cutting) in step A6 will be described in more detail with reference to the flow chart shown in FIG. 7. In the data sampling processing, in step B1, the CPU 11 supplies the reset signal to the counter St in the section 16, thus resetting the count thereof to "0". Simultaneously, the CPU 11 sets the content of the counter n to be 1. It is checked in step B2 if the signal z generated from the strain gauge 3c is changed. That is, the signal z generated from the gauge 3c is A/D converted by the converter 14, is latched in the z latch 151, and is then transferred to the circuit 152. The circuit 152 compares the signal z latched in the latch 151 and the signal z generated from the converter 14 at the next timing, and supplies the comparison result to the CPU 11. Therefore, the CPU 11 can check from the comparison result of the circuit 152 if the signal z is changed. In step B2, the discrimination operation is repeated until the signal z is changed. If YES in step B2, it is determined that handwriting input by the ballpoint pen is started (the data cutting begins), and the flow advances to step B3. In this case, the counter 153 is reset by the output from the circuit 152. In step B3, the signals x, y and z generated from the converter 14 are written in the latches x0, y0 and z0, respectively. It is checked from the output signal of the circuit 152 in step B4 if the signal z is changed. If YES in step B4, the flow advances to step B5. In step B5, the signals x, y and z generated from the converter 14 are supplied to the memory 161 and are written at the addresses designated by the counter n. Simultaneously, in step B6, the circuit 154 checks if the write data xn, yn and zn are equal to the holding data of the latches x0, y0 and z0. If NO in step B6, i.e., if the input data xn, yn and zn are changed from the zero point data x0, y0 and z0, the content of the counter n is incremented by one in step B7, and thereafter the flow returns to step B5. While the handwriting input is continuously performed, since the input data xn, yn and zn do not coincide with the zero point data z0, y0 and z0, the processing between steps B5 to B7 is repeated, thus sequentially writing the input data in the memory 161. When a predetermined stroke input is completed and the pen is released from a paper surface, the input data xn, yn and zn coincide with the data x0, y0 and z0, and since YES in step B6, the flow advances to step B8. In step B8, the content of the counter St is incremented by one in response to a signal from the CPU 11. In step B9, the count of the counter n is written in the register Ds, and the flow then returns to step B4. In step B4, it is checked if the output signal from the circuit 152 is changed, and if NO in step B4, the flow advances to step B10. It is checked from the output signal from the counter 153 in step B10 if one second has passed. The counter 153 starts counting when the output signal from the circuit 152 goes to the "0" level, and when one second has passed, it supplies a carry signal to the CPU 11. If NO in step B10, the flow returns to step B4 so as to check a change in the signal z. If the signal z is changed before the lapse of one second, it is determined that the next stroke input in the input character is started. Thus, the input data is stored in the memory 161 in accordance with the processing in step B5 and thereafter. When the signal z is not changed after the lapse of one second, it is determined that one character input operation is completed, thus ending the data sampling processing. In this manner, the sampling data x1, x2,..., xn, y1, y2,..., yn, z1, z2,..., zn are written in the memory 161. When the data sampling processing ends, the routine enters the data standardization processing shown in step A7 in FIG. 6.

The standardization processing in step A7 will be described in more detail with reference to the flow chart shown in FIG. 8. In step C1, the counter n in the section 16 is reset and "1" is set in the counter m in the section 17. In step C2, the data last write address of the memory 161 stored in the register Ds of the section 16 is supplied to the circuit 162 and is divided by the constant A ($=12$). The operation result is added to the content of the counter n. In this case, the resultant value is rounded at its first decimal place. The flow then advances to step C3, and the data xn, yn and zn stored in the memory 161 are read out and the readout data are written in the memory 171. Thereafter, in step C4, the circuit 172 checks if the count of the counter m has reached the constant A ($=12$), and if NO in step C4, the content of the counter m is incremented by one in step C5, and the flow thus returns to step C2. The same operation is repeated until the count of the counter m reaches the constant A, and the data stored in the memory 161 is sequentially written in the memory 171. In the standardization processing, the input data stored in the memory 161 are compressed to 12 data DX1, DX2,..., DX12, DY1, DY2,..., DY12, DZ1, DZ2,..., DZ12, i.e., subjected to data compression processing on the basis of the x, y and z signal system, and the compression data are stored in the memory 171. When the count of the counter m reaches the constant A, a coincidence signal is supplied from the circuit 172 to the CPU 11. Thus, the CPU 11 ends the data standardization processing, and the flow advances to step A8 shown in FIG. 6.

Figure 7:
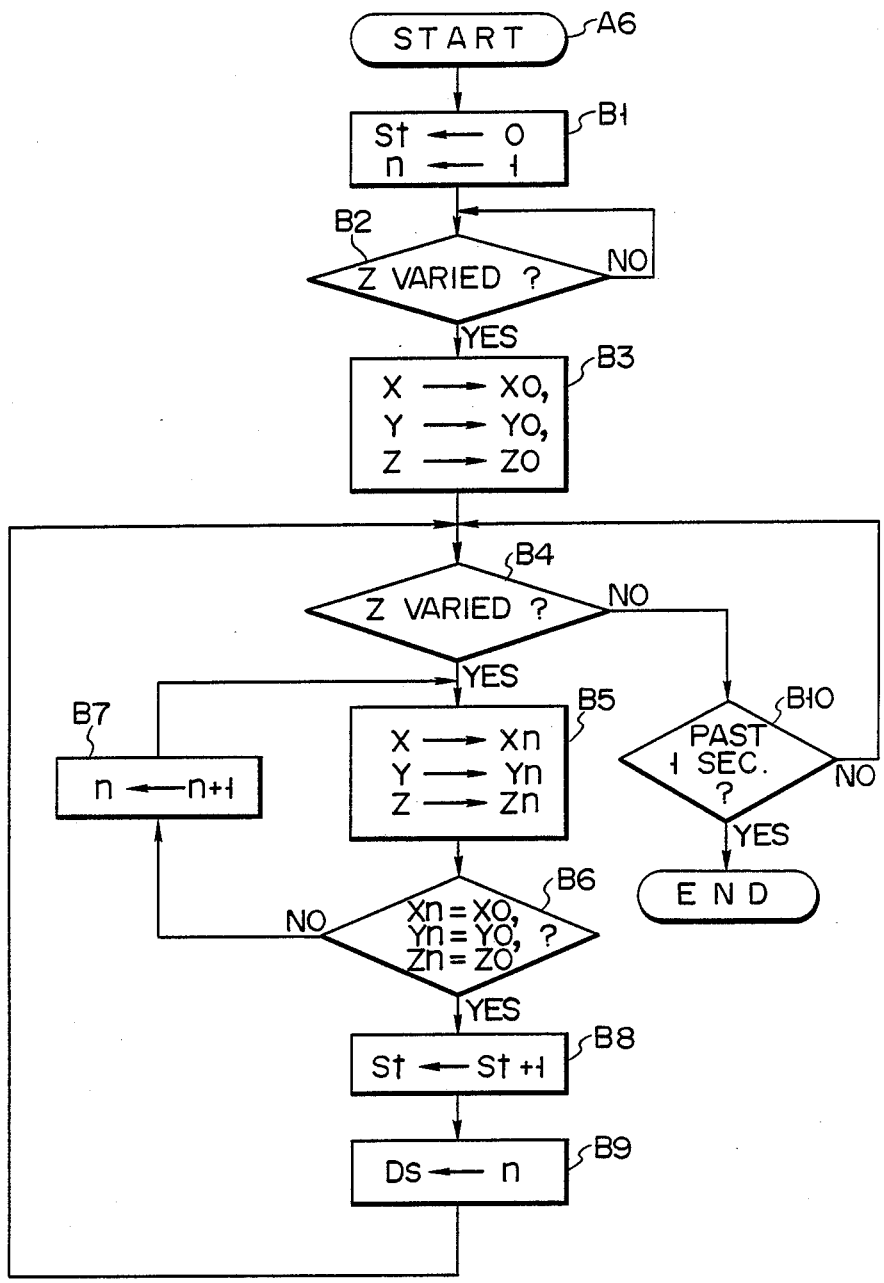
FIG. 7 is a flow chart showing an input data sampling operation of the first embodiment.
Figure 8:
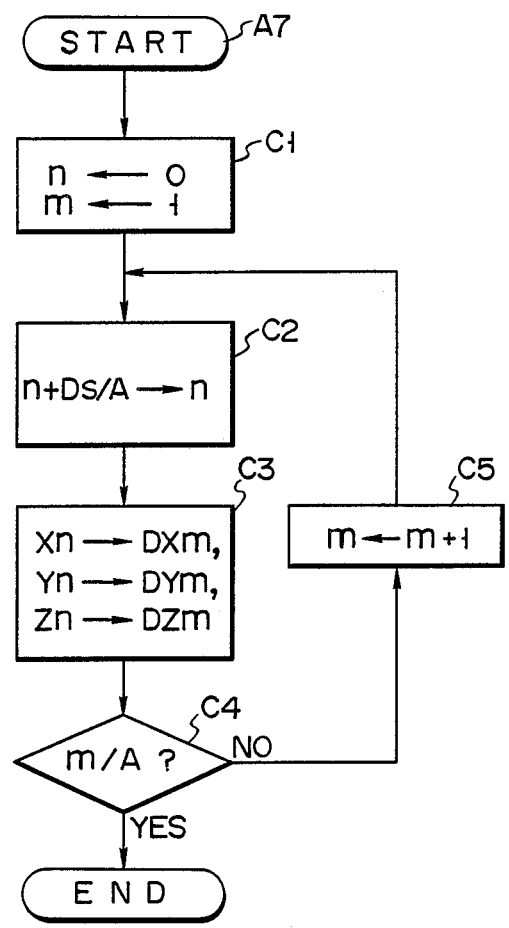
FIG. 8 is a flow chart showing an input data standardization operation of the first embodiment.

As described above, after the standard patterns are registered in the memory 181 in accordance with the processing shown in FIGS. 6 to 8, when the recognition mode is designated by operating the mode key 6, the input character recognition processing can be performed.

Figure 9:
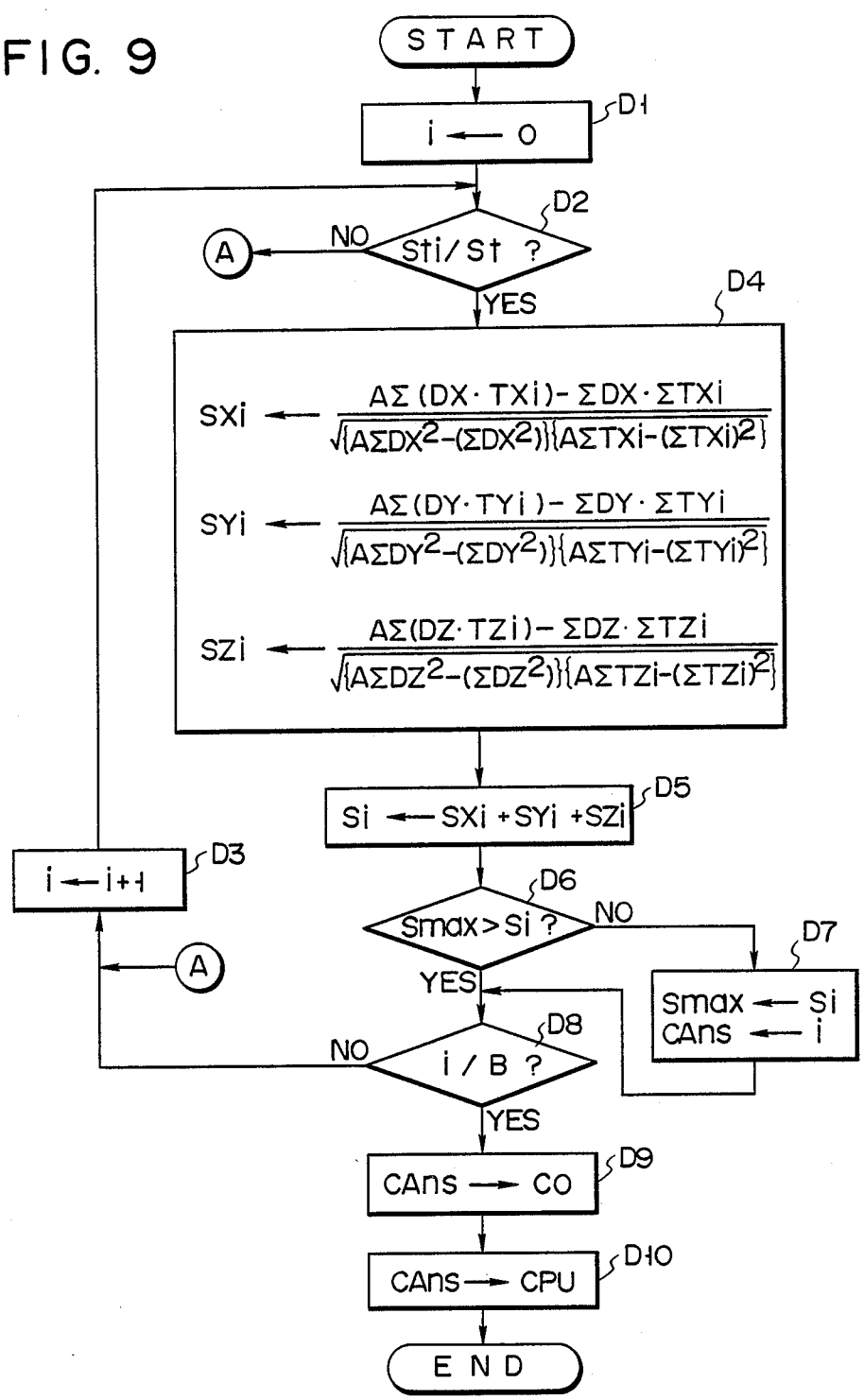
FIG. 9 is a flow chart showing an input data recognition operation of the first embodiment.

The input character recognition processing will be described with reference to FIG. 9. When characters are handwritten in the character recognition mode, the input data sampling operation is performed in accordance with the same processing as shown in the flow chart of FIG. 7, and the sampled data is written in the memory 161. Thereafter, in accordance with the same processing as shown in the flow chart of FIG. 8, the data standardization processing is performed, and the standardized data is written in the memory 171. The CPU 11 resets the counter i in the section 18. In step D2, stroke data STi is transferred from the memory 181 to the circuit 192 in accordance with the address designated by the counter i, and it is checked if the data STi coincides with the stroke number stored in the counter St. If NO in step D2, the flow advances to step D3, and the content of the counter i is incremented by one, and thereafter the flow returns to step D2. The content of the counter i is counted up until the stroke data read out from the memory 181 and the stroke number stored in the counter St coincide with each other. If YES in step D2, the standardization data stored in the memory 171 and the standard patterns stored in the memory 181 are transferred to the section 191, and the correlation values SXi, SYi and SZi thereof are calculated in step D4. The correlation values SXi, SYi and SZi are calculated as follows:

$$SXi = \{A\Sigma(DX \cdot TXi) - \Sigma DX \cdot \Sigma TXi\}/$$
$$\sqrt{\{A\Sigma DX^2 - (\Sigma DX)^2\}\{A\Sigma TXi - (\Sigma TXi)^2\}}$$
$$SYi = \{A\Sigma(DY \cdot TYi) - \Sigma DY \cdot \Sigma TYi\}/$$
$$\sqrt{\{A\Sigma DY^2 - (\Sigma DY)^2\}\{A\Sigma TYi - (\Sigma TYi)^2\}}$$
$$SZi = \{A\Sigma(DZ \cdot TZi) - \Sigma DZ \cdot \Sigma TZi\}/$$
$$\sqrt{\{A\Sigma DZ^2 - (\Sigma DZ)^2\}\{A\Sigma TZi - (\Sigma TZi)^2\}}$$

Thereafter, the flow advances to step D5, and the correlation values SXi, SYi and SZi obtained by the section 191 are transferred to the section 193 to be added with each other. Then, sum data Si is supplied to the section 194. When the section 194 receives the sum data Si from the section 193, it checks in step D6 if the sum data Si is smaller than the data stored in the register Smax. If NO in step D6, the flow advances to step D7. In step D7, the sum data Si is written in the register Smax, and the count of the counter i is written in the register Cans, thus updating the maximum correlation value. However, if YES In step D6, the flow advances to step D8, and the circuit 182 checks if the count of the counter i has reached the constant B (=15) supplied from the CPU 11. If NO in step D8, the content of the counter i is incremented by one in step D3, and the flow returns to step D2. The same processing is repeated until the count of the counter i reaches the constant B. When the count of the counter i reaches the constant B, since YES in step D8, the flow advances to step D9. In step D9, the data Ci held in the register Cans in the section 194, i.e., the recognition result is written in the register Co, and the recognition result held in the register Cans is supplied to the CPU 11 in step D10. When the CPU 11 receives the data Ci from the register Cans, it supplies the character pattern corresponding to the data Ci to the section 20, and causes the display section 4 to display the pattern. In this case, when the recognized characters include function data indicating an operation, the CPU 11 supplies an operation instruction corresponding to the function data to the section 20, and causes the section 4 to display the operation result. As described above, the input character recognition processing is completed.

The operation for correcting the erroneously recognized input character will be described. As shown in FIG. 10, when an equation "12 +34=" is handwritten, assume that numeral "3" is erroneously recognized as numeral "8". The numeral "3" is recognized in accordance with the flow chart shown in FIG. 10, and the maximum correlation value is written in the register Smax in the section 194. In addition, the current count Ci of the counter i is written in the registers Co and Cans. In this case, since the numeral "3" is erroneously recognized as the numeral "8", the data Ci corresponding to the numeral "8" is written in the registers Co and Cans. The data held in the register Cans is supplied to the CPU 11, and "8" is displayed on the display section 4, as shown in FIG. 10.

Figure 11:
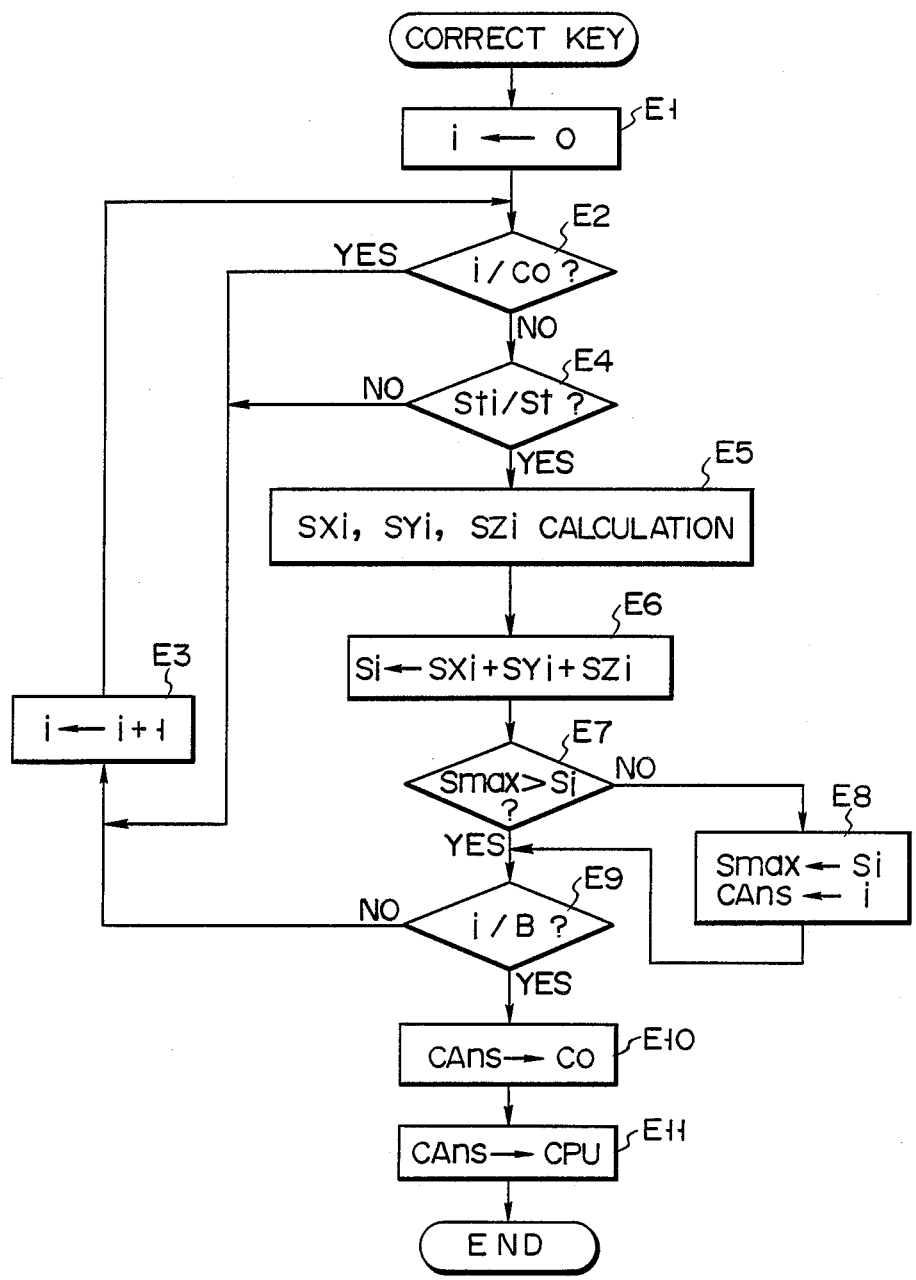
FIG. 11 is a flow chart of the correction operation of the first embodiment.

When the input character is erroneously recognized, the correction key 8 is operated, as shown in FIG. 10(5). Upon depression of the key 8, the correction processing shown in the flow chart of FIG. 11 is initiated. In step E1, "0" is written in the counter i shown in FIG. 5, and it is checked in step E2 if the same value as the count of the counter i is held in the register Co. If YES in step E2, the flow advances to step E3, and the content of the counter i is incremented by one. Thereafter, the flow returns to step E2. That is, the erroneously recognized result can no longer be an object to be recognized. If NO in step E2, the flow advances to step E4, and the stroke data STi is read out from the memory 181 in accordance with the assigned address of the counter i and the readout data is supplied to the circuit 192. It is checked in step E4 if the readout data coincides with the stroke number stored in the stroke counter St. If NO in step E4, the flow return to step E2 via step E3. In this manner, the content of the counter i is counted up until the stroke data read out from the memory 181 coincides with the stroke number held in the counter St. If YES in step E4, the standardization data held in the memory 171 and the standard patterns stored in the memory 181 are transferred to the section 191 in step E5, and the correlation values SXi, SYi and SZi thereof are calculated. This operation is performed in the same manner as in step D4 in FIG. 9. The correlation values SXi, SYi and SZi obtained in step E5 are transferred to the section 193 and are added to each other, thus obtaining the sum data Si. The sum data Si is transferred to the section 194. When the sum data Si is supplied from the section 193 to the section 194, the section 194 checks in step E7 if the sum data Si is smaller than the data held in the register Smax. If NO in step E7, the flow advances to step E8. The sum data Si is written in the register Smax, and the current count of the counter i is written in the register Cans, thus updating the maximum correlation value. If YES in step E7, the flow advances to step E9, and the circuit 182 checks if the count of the counter i has reached the constant B (=15) supplied from the CPU 11. If NO in step E9, the flow returns to step E2 via step E3. Thereafter, the same operation is repeated and when the count of the counter i has reached the constant B, since YES in step E9, the flow advances to step E10. In step E10, the data Ci held in the register Cans in the section 194 is written in the register Co. In this case, the recognition result (erroneously recognized data) which has been already written in the register Co is not cleared but held therein. In step E11, the data Ci held in the register Cans is supplied to the CPU 11. When the data Ci is supplied to the CPU 11, the CPU 11 supplies the character pattern corresponding to the data Ci to the section 20, and causes the display section 4 to display the pattern. As described above, the second largest correlation value with respect to the input character "3" is obtained, and is displayed as the recognition result, as shown in FIG. 10(5). When erroneous recognition occurs, the correlation value of the actual character to be input is approximate to the maximum correlation value, and is stored as the second or third largest correlation value. Therefore, when the second largest correlation value is obtained upon depression of the correction key 8, the correct recognition result can be obtained. As described above, when the second largest correlation value is obtained upon depression of the key 8 and the recognition result is displayed, if it is not correct, the key 8 is depressed again. The processing shown in the flow chart of FIG. 11 is repeated, and the next largest correlation value is obtained and is displayed. In the same manner as described above, every time the key 8 is depressed, the recognition results are sequentially displayed in an order of larger correlation values. When the correct recognition result is obtained, the next characters, i.e., "4" and "=" are handwritten, as shown in FIGS. 10(6) and 10(7). When the symbol "=" is handwritten, the CPU supplies an operation instruction to the section 20 in accordance with the function data "+" which has been input in advance so as to calculate "12 +34=46", and the resultant data "46" is displayed on the section 4. In this state, when the clear key 9 is operated, as shown in FIG. 10(8), the storage contents of the sections 16, 17, 19 and 20 are cleared, thus returning to the initial state.

In the first embodiment, the operation mode is set by the mode key 6. However, for example, a rotary switch can be provided in a head portion of a pen. In this case, the head portion of the pen is rotated so as to set the operation mode.

In the first embodiment, a semiconductor strain gauge is used as a piezoelectric element for detecting a pressure and a direction of handwriting. The present invention is not limited to this. Instead, a piezoelectric rubber can be used.

In the first embodiment, presence/absence of the handwriting input is detected in accordance with that of the signal z. However, the presence/absence of the handwriting input can be detected using the signal x or y instead of the signal z.

As described above, according to the first embodiment of the present invention, handwriting input characters of the user are registered in the standard pattern memory as standard patterns by condensing the data, and thereafter, a correlation value operation between the handwriting input data and the standard pattern stored in the standard pattern memory is performed so as to recognize the input character. For this reason, handwriting input characters which differ in accordance with users can be satisfactorily recognized. Thus, a practical pen-type character recognition apparatus can be provided.

Furthermore, correlation value operation between the handwritten input character and the standard pattern stored in the standard pattern memory is performed so as to display the recognition character having the maximum correlation value. When the correction key is depressed, a character having the second largest correlation value is displayed as the correction character. For this reason, when the input character is erroneously recognized, the input character can be easily corrected without requiring the reinputting of the character, thus obtaining a practical effect.

In the registering mode, a so-called skip function is provided in which a character requiring registration (including re-registration) and a character requiring no registration are rapidly selected. Thus, the registration processing can be simplified.

A second embodiment of the present invention will be described in which the data sampling method, i.e., the data cutting method is different from that of the first embodiment.

Figure 12:
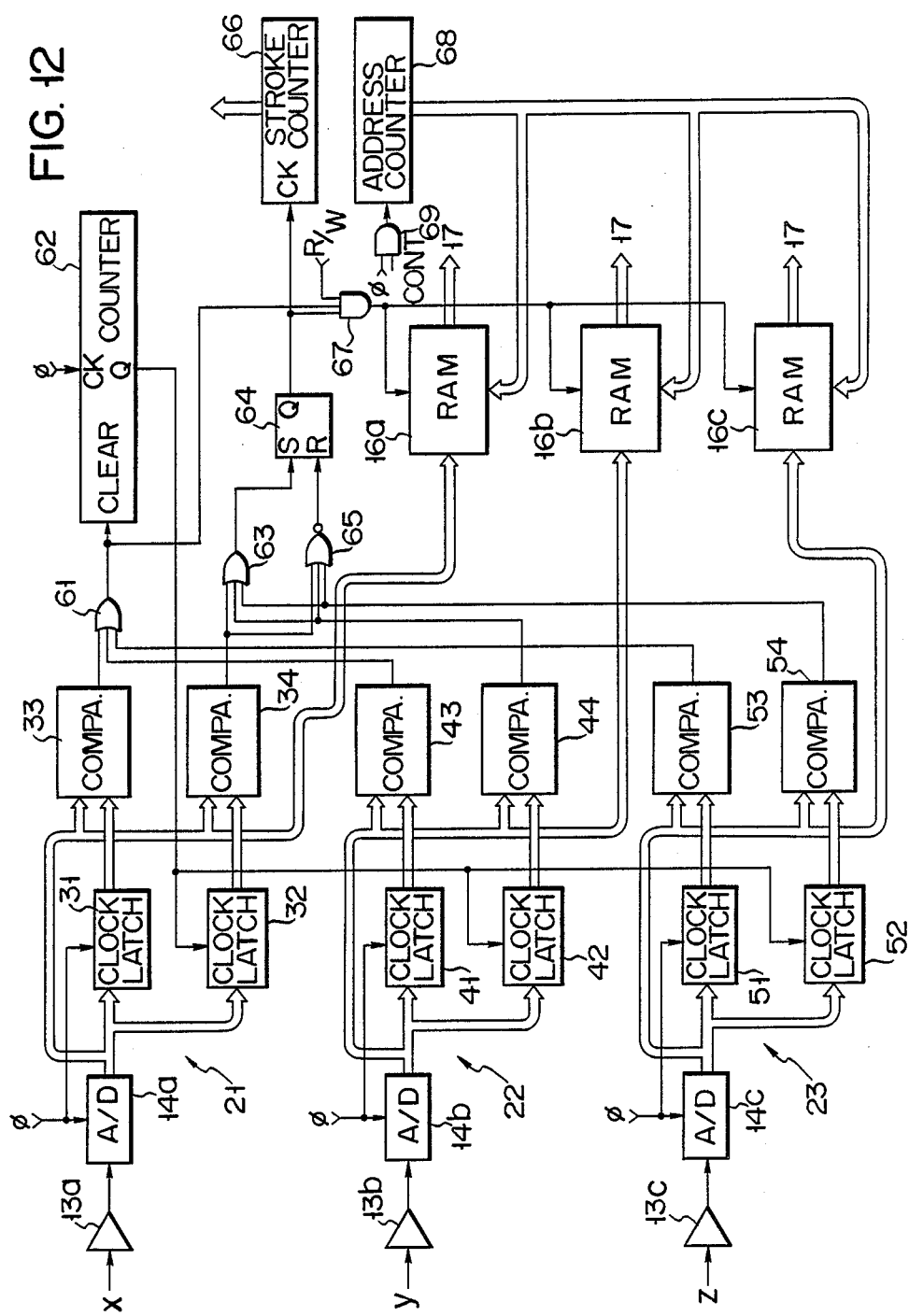
FIG. 12 is a block diagram of a data cutting section and a data memory section according to a second embodiment of the present invention.

FIG. 12 shows a DC amplifier 13, an A/D converter 14, a data cutting section 15 and a data memory section in more detail. FIG. 12, shows an x signal processing circuit 21; a y signal processing circuit 22; and a z signal processing circuit 23. The circuits 21 to 23 have the same arrangement. In the circuit 21, a DC amplifier 13a amplifies an x signal component supplied from a strain gauge 3a. An output signal from the amplifier 13a is supplied to an A/D converter 14a. The A/D converter 14a performs A/D conversion in synchronism with a clock pulse $\phi$, and the output signal therefrom is supplied to an x data latch 31, an x-zero-point latch 32 and comparing circuits 33 and 34 in the section 15, and is also supplied to an x data RAM 16a. The data latched in the latch 31 is supplied to the circuit 33, and the data latched in the latch 32 is supplied to the circuit 34. The circuits 33 and 34 generate a "0" signal when the input data coincide with each other, and otherwise, generate a "1" signal.

In the same manner as in the circuit 21, the y signal processing circuit 22 is constituted by a DC amplifier 13b for amplifying a y signal component, an A/D converter 14b, a y data latch 41, a y-zero-point latch 42, comparing circuits 43 and 44 and a y data RAM 16b in the section 16. Similarly, the z signal processing circuit 23 is also constituted by a DC amplifier 13c for amplifying a z signal component, an A/D converter 14c, a z data latch 51, a z-zero-point latch 52, comparing circuits 53 and 54 and a z data RAM 16c in the section 16.

The outputs from the circuits 33, 43 and 53 are supplied to a clear terminal of a zero-point counter 62 through an OR gate 61. The counter 62 counts the clock pulses $\alpha$, and generates a pulse signal from the output terminal Q every time 100 msec passes. The output from the counter 62 is supplied to the latches 32, 42, and 52 as a latch clock. The outputs from the circuits 34, 44 and 54 are supplied to a set terminal S of a flip-flop 64 through an OR gate 63, and are also supplied to a reset terminal of the flip-flop 64 through a NOR gate 65. The output from the flip-flop 64 is supplied to a clock terminal CK of a stroke counter 66 and an AND gate 67. The counter 66 has a 3-bit arrangement, and the count thereof is supplied to a standardization data memory section 17. The AND gate 67 receives the output from the flip-flop 64 and a read/write signal R/W supplied from the CPU 11, and the output from the AND gate 67 is supplied to the RAMs 16a, 16b and 16c as a read/write instruction. Addresses of the RAMs 16a, 16b and 16c are designated by an address counter 68. Data read out from the RAMs 16a, 16b and 16c are supplied to the section 17. The clock pulse $\phi$ and a control signal Cont are supplied to a clock terminal of the counter 68 through an AND gate 69.

Figure 13:
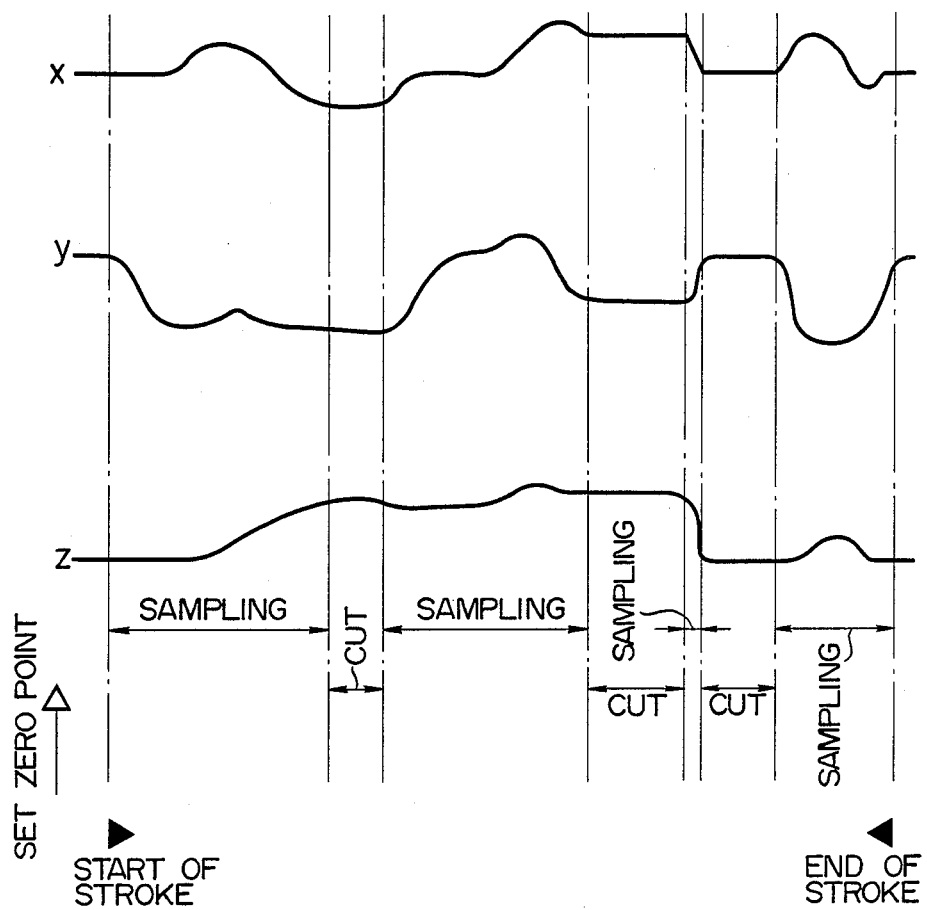
FIG. 13 is a flow chart for explaining a data cutting operation of the second embodiment.

The operation of the second embodiment will be described. When no character is handwritten, the signals x, y and z generated from the strain gauges 3a, 3b and 3c have a constant level, as shown in FIG. 13. The output signals x, y and z from the gauges 3a, 3b and 3c are amplified by the amplifiers 13a, 13b and 13c and thereafter supplied to the A/D converters 14a, 14b and 14cso as to be converted into digital signals in synchronism with the clock pulse $\phi$. The output data from the converters 14a, 14b and 14c are latched by the latches 31, 41 and 51 in synchronism with the clock pulse $\phi$, respectively. The data latched in the latches 31, 41 and 51 are supplied to the circuits 33, 43 and 53, and are compared with the next data supplied from the converters 14a, 14b and 14c. When no character is handwritten, the data held in the latches 31, 41 and 51 are equal to the next data generated from the converters 14a, 14b and 14c, and the outputs from the circuits 33, 43 and 53 are kept at the "0" level. In this case, the output from the OR gate 61 is "0" and the counter 62 is not cleared. For this reason, the counter 62 counts the clock pulse $\phi$. When no pen input is detected after a lapse of 100 msec, the counter 62 generates the pulse signal from the output terminal Q thereof, and writes the outputs from the converters 14a, 14b and 14c as zero-point data in the latches 32, 42 and 52, respectively. Thereafter, when one of the character detection signals x, y and z is changed from the zero point level, it is detected that a user begins to handwrite a character, thus starting a sampling operation. As described above, when the zero point data are latched by the latches 32, 42 and 52, the zero point data are compared with the output data from the converters 14a, 14b and 14c by the circuits 34, 44 and 54, respectively. Thus, the circuits 34, 44 and 54 generate "1" signals in accordance with a change in the character detection signals x, y and z. The outputs from the circuits 34, 44 and 54 are supplied to the flip-flop 64, thus setting the flip-flop 64. The Q output from the flip-flop 64 is supplied to the counter 66 so as to increment the content thereof by one, and is also supplied to the AND gate 67. When the signals x, y and z are changed, the output from the OR gate 61 goes to the "1" level, and is supplied to the AND gate 67. In addition, the output from the OR gate 61 is supplied to the clear terminal of the counter 62, thus resetting the counter 62. Since the AND gate 67 receives a write instruction during the character input operation, the AND gate 67 is enabled, and the output therefrom goes to the "1" level, thus supplying the write instruction to the RAMs 16a, 16b and 16c. The digital data generated from the converters 14a, 14b and 14c are written at the addresses in the RAMs 16a, 16b and 16c designated by the counter 68, respectively. Therefore, when the pen is temporarily stopped on a paper sheet during the character input operation, the outputs from the converters 14a, 14b and 14c become constant although shifted from the zero points, as shown in FIG. 13. For this reason, the outputs from the circuits 33, 43 and 53 go to the "0" level. Thus, the output from the OR gate 61 goes to the "0" level, thus disabling the AND gate 67. Therefore, the output from the AND gate 67 goes to the "0" level, and the write operation to the RAMs 16a, 16b and 16c is disabled. If the character input operation is resumed by moving the pen from this state, "1" signals are generated from the circuits 33, 43 and 53, and the AND gate 67 is enabled, thus supplying the write instruction to the RAMs 16a, 16b and 16c. Therefore, the data write operation in the RAMs 16a, 16b and 16c is resumed. Thereafter, when the pen is raised from the paper sheet, the outputs from the circuits 14a, 14b and 14c are returned to the zero points, and all the outputs from the circuits 33, 43, 53, 34, 44 and 54 go to the "0" level. Thus, the output from the NOR gate 65 goes to the "1" level and the flip-flop 64 is reset, thus disabling the AND gate 67. Therefore, the data write operation in the RAMs 16a, 16b and 16c is inhibited. A data cutting operation for one stroke is completed as described above. The same operation is repeated for each stroke. Then, the data from the RAMs 16a, 16b and 16c and the count content of the counter 66 are transferred to the section 17, and are compared with registration standard patterns by a recognition operation section 19, thus recognizing the input characters. The recognition result from the section 19 is supplied to an operation memory section 20 through a CPU 11, and is displayed on a display section 4.

In the second embodiment, the character detection signals x, y and z are A/D converted by the A/D converters 11a, 11b and 11c by parallel processing. However, in the same manner as in the first embodiment, the signals x, y and z can be time-divisionally A/D converted by using a single A/D converter.

Three RAMs 16a, 16b and 16c are provided in the data memory section 16. However, in the same manner as in the first embodiment, the character detection signals x, y and z can be stored in a single RAM.

As described above, a detection signal of an input character detection element before a character input operation is stored as a reference zero point signal, and presence/absence of input data is discriminated from a comparison between the reference zero point signal and a character detection signal. Only when it is detected that input data is present, the character detection signal is sampled and stored in a memory. Thus, a data cutting amount is decreased and an object of this embodiment can be achieved with a small memory capacity. In addition, a data cutting operation with respect to the input character can be accurately performed.

Figure 14A:
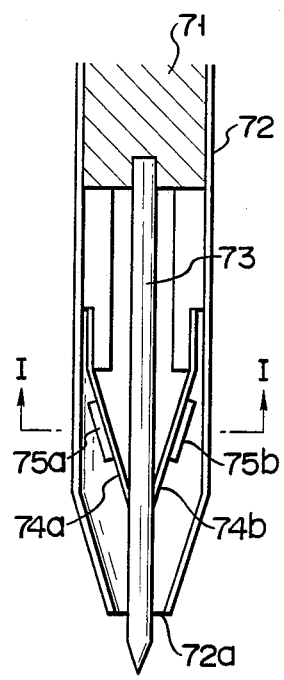
FIG. 14A is a sectional view showing a main part of a writing tool according to a third embodiment of the present invention.
Figure 14B:
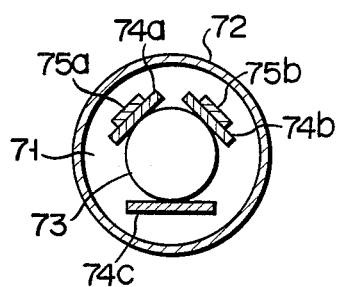
FIG. 14B is a sectional view taken along a line I—I of FIG. 14A.

A DC amplifier section according to a third embodiment of the present invention will be described hereinafter. FIGS. 14A and 14B show a writing tool main body 71 as a ballpoint pen; and a case 72. A ballpoint pen tip element 73 is arranged in the case 72 along the central axis thereof, and a base portion thereof is supported by the main body 71. A distal end of the tip element 73 externally extends from an opening 72a formed at a distal end portion of the case 72. A central portion of the tip element 73 is supported by springs 74a, 74b and 74c fixed to the main body 71 at equal intervals so as to be held at a central portion of the case 72. Piezoelectric elements, e.g., semiconductor strain gauges (to be referred to as strain gauges hereinafter) 75a and 75b are mounted on the springs 74a and 74b, respectively. The strain gauges 75a and 75b are connected to an electric circuit provided in the case 72.

Figure 15:
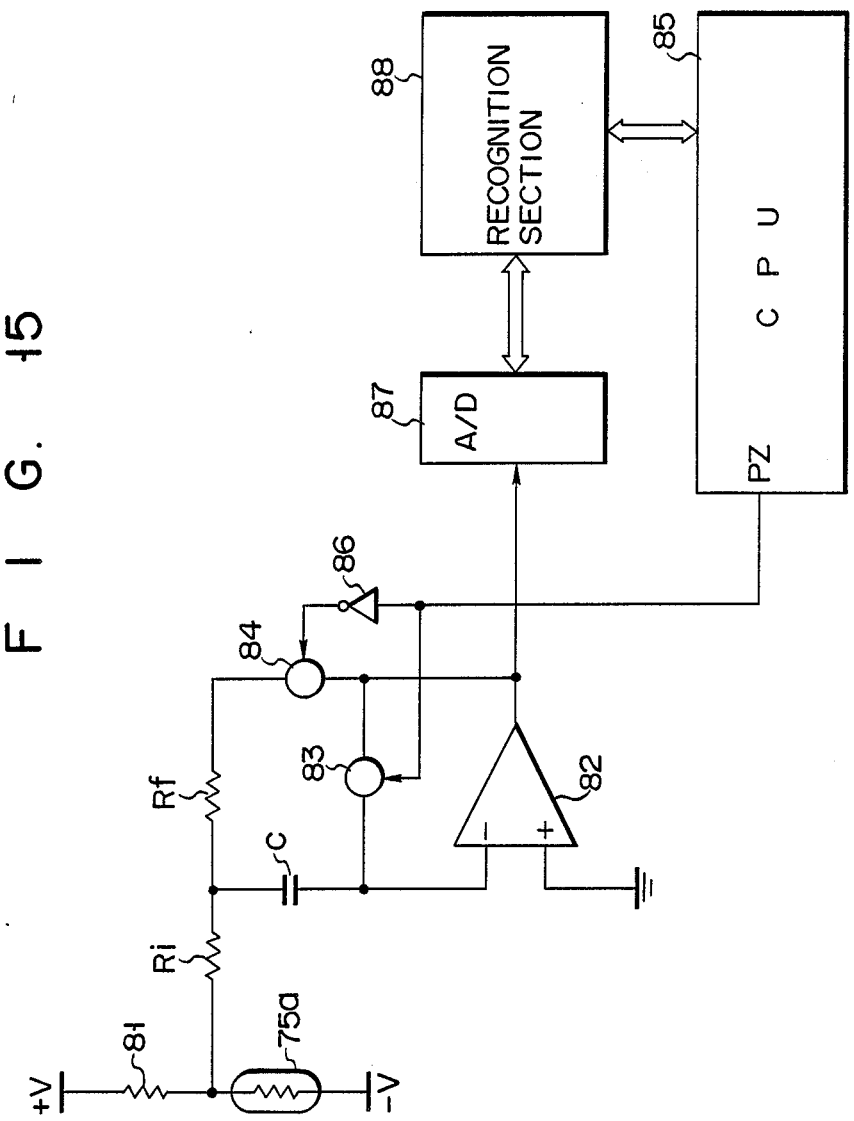
FIG. 15 is a view showing an internal electronic circuit of FIG. 14.

The arrangement of the electric circuit will be described with reference to FIG. 15. For the sake of simplicity, FIG. 15 shows a signal system only for the strain gauge 75a. The strain gauge 75a has one end connected to a $-V$ power source, and the other end connected to a $+V$ power source through a resistor 81. A node between the strain gauge 75a and the resistor 81 is connected to a negative terminal of an OP amp 82 through an input resistor Ri and a capacitor C. A positive terminal of the OP amp 82 is grounded and a first switching element 83 is connected between the output and negative terminals thereof. The output terminal of the OP amp 82 is connected to a node between the input resistor Ri and the capacitor C serially through a second switching element 84 and a feedback resistor Rf. The first switching element 83 receives a pen zero signal PZ supplied from the CPU 85 as an ON/OFF control signal, and the second switching element 84 receives the signal PZ as the ON/OFF control signal through an inverter 86. The CPU 85 generates the signal PZ when the power source is turned on and when a character recognition operation ends. The output from the OP amp 82 is supplied to an A/D converter 87 and is converted into a digital signal. Thereafter, the digital signal is supplied to a recognition section 88. The section 88 performs the recognition operation in accordance with a control instruction from the CPU 85 upon reception of input character data through the A/D converter 87.

Figure 16A:
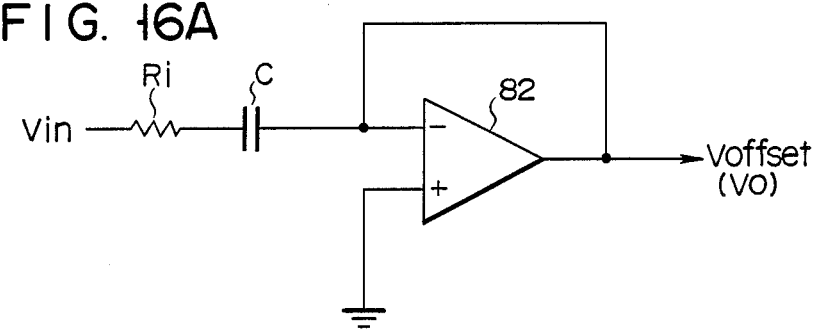
Figs. 16A to 16C show equivalent circuit diagrams of a main part shown in FIG. 15.

The operation of the third embodiment will be described hereinafter. When the power source is turned on, the pen zero signal PZ is generated from the CPU 85 for a predetermined period of time, and the element 83 is turned on. In this case, the output from the inverter 86 is at logic level "0", and the element 84 is turned off. As a result, the output and negative terminals of the OP amp 82 are short-circuited, as shown in an equivalent circuit diagram in FIG. 16A, and the OP amp 82 serves as a voltage follower. In this case, a voltage Voffset as a sum of the ground potential and an offset output is generated as an output voltage Vo of the OP amp 82. Therefore, a difference voltage Vc between an input voltage Vin supplied through the input resistor Ri and the output voltage Vo from the OP amp 82 is charged on the capacitor C at a time constant of "$\tau$=Co Ri". In this case, if the element 83 is disabled during a time interval longer than the time constant $\tau$, the difference voltage Vc (Vc = Vin − Voffset) between the input voltage Vin and the output voltage Vo from the OP amp 82 is sufficiently charged on the capacitor C.

Figure 16B:
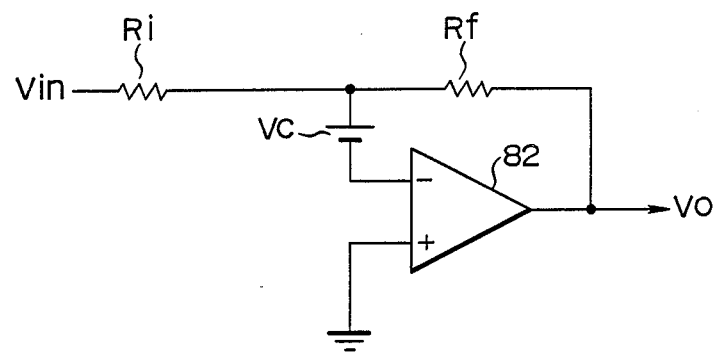

After charging the capacitor C, the signal PZ generated from the CPU 85 goes to the "0" level, and the element 83 is turned off. In addition, the output from the element 84 goes to the "1" level, thus turning on the element 84. As a result, as shown in an equivalent circuit diagram of FIG. 16B, the resistor Rf is connected between the input and output terminals of the OP amp 82, thus constituting an inverting amplifier circuit. At this time, since the voltage Vc is stored on the capacitor C, this state is equivalent to a state wherein a battery having the voltage Vc is inserted between the negative terminal of the OP amp 82 and the resistors Ri and Rf. Therefore, in this state, the following relation is established:

$$Vo = Vc + V\text{offset}$$
$$= Vin - V\text{offset} + V\text{offset} = Vin$$

Figure 16C:
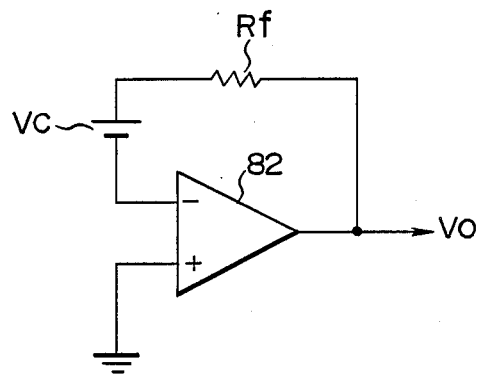

Thus, since no circuit current flows, the voltage Vin appears at the node between the capacitor C and the resistor Rf. Since the voltage Vin is also supplied to a signal input terminal side of the resistor Ri, the OP amp 82 is stabilized, and is equivalent to a state wherein the resistor Ri is omitted, as shown in FIG. 16C.

In this state, when the input voltage Vin changes by ΔV, the rate of change ΔV is multiplied by Rf/Ri from the offset point Vin and is generated from the OP amp 82. That is, only an input signal can be amplified without amplifying bias and offset voltages. Therefore when numerals or letters are handwritten by the ballpoint pen shown in FIG. 14, the handwriting operation is detected by the strain gauge 75a, and the detection signal is supplied to the OP amp 82 as the input signal Vin. Thus, only a signal change component is amplified. The output signal from the OP amp 82 is converted into a digital signal by the A/D converter 87, and the digital signal is supplied to the section 88. The section 88 begins character recognition processing under the control of the CPU 85 upon reception of the data from the A/D converter 87, and supplies the recognition result to the CPU 85. When the section 88 completes the recognition processing, the CPU 85 supplies the recognition result to a display section (not shown) so as to display it thereon. When the section 88 completes the character recognition processing, the CPU 85 generates the signal PZ for a predetermined period of time, and repeats the same operation as described in FIGS. 16A to 16C. Thus, the offset output from the OP amp 82 is charged on the capacitor C, thus preparing for the next handwriting input.

The same circuit as that of the strain gauge 75a is connected to the strain gauge 75b, and the output signal from the OP amp is converted into a digital signal by the A/D converter to be supplied to the section 88.

As described above, according to the third embodiment of the present invention, when no handwriting input is supplied, an offset voltage of an amplifier is charged on a capacitor, and a charged voltage of the capacitor is supplied to the amplifier as a bias voltage. Thus, the offset voltage is cancelled and only the handwriting input can be amplified. Therefore, the object of the invention can be achieved with a simple circuit arrangement. When a pen input detection signal is changed from a preset level over time, or when an offset phenomenon occurs in an amplifier for amplifying the detection signal, this can be overcome, and only the handwriting input is precisely amplified. As described above, since the amplifier is not influenced by the offset phenomenon, the dynamic range of a signal can be widened.

Figure 17:
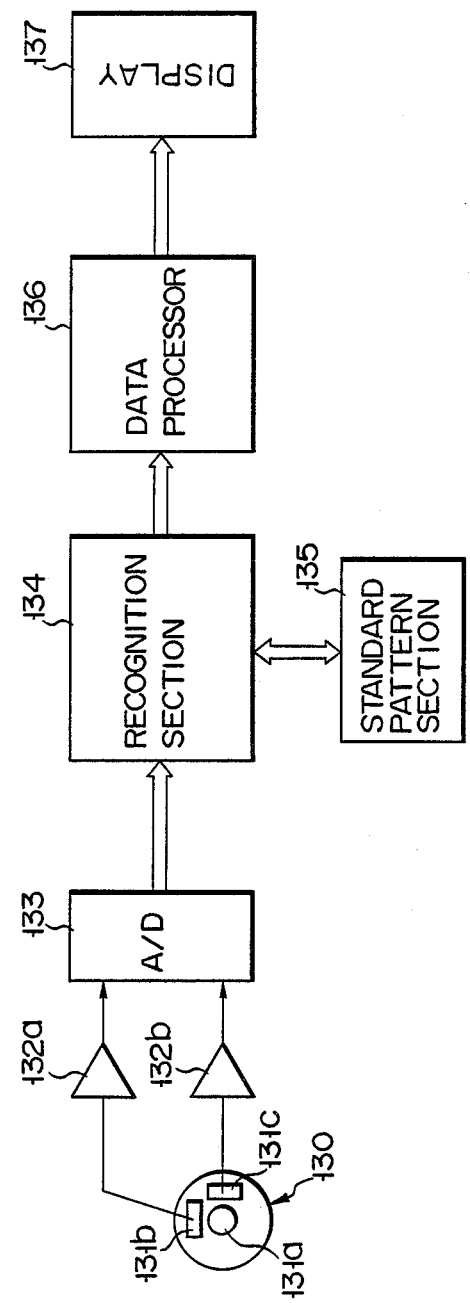
FIG. 17 is a block diagram showing an arrangement according to a fourth embodiment of the present invention.

An improved semiconductor strain gauge used as the piezoelectric element according to a fourth embodiment of the present invention will be described. FIG. 17 shows a writing tool main body 130 as a ballpoint pen. Detection sections 131b and 131c are provided so as to surround a tip element 131a of the ballpoint pen and to be perpendicular to each other. Each of the detection sections 131b and 131c comprises an elastic element such as a plate spring on which a semiconductor strain gauge 120 is formed.

Figure 20:
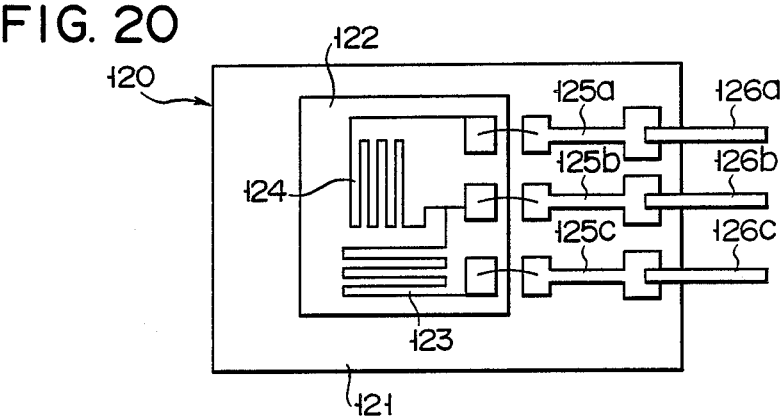
FIG. 20 is a plan view showing a semiconductor strain gauge used as a piezoelectric element of the fourth embodiment.

FIG. 20 is a plan view of the semiconductor strain gauge 120. A semiconductor chip 122 is adhered to a base substrate 121. A gauge resistor 123 which is formed in a comb shape to achieve a desired pressure sensitive direction and a dummy resistor 124 also formed in a similar shape to achieve a pressure sensitive direction, having substantially an angle of 90° with respect to the pressure sensitive direction of the gauge resistor 123, are formed on the chip 122 by diffusion. The resistors 123 and 124 are connected in series with each other. Two ends and a node of the series-connected resistors 123 and 124 are connected to electrodes 125a to 125c formed on the substrate 121, respectively. The electrodes 125a to 125c are connected to lead wires 126a to 126c.

When a user handwrites a letter with the main body 130 in the same manner as with a normal ballpoint pen, a pressure is applied to the sections 131b and 131c in accordance with the direction of handwriting. In each of the gauges 120 provided on the sections 131b and 131c, the resistors 123 and 124 generate outputs, and the outputs are amplified by amplifiers 132a and 132b to a proper level. Thereafter, the outputs are supplied to an A/D converter 133. The converter 133 converts the two input signals into digital signals, and supplies the digital signals to a recognition section 134 as output data. The section 134 recognizes what types of characters or numerals are handwritten by the main body 130. The section 134 performs a predetermined operation based upon the outputs from the converter 133, and the operation result is compared with a standard pattern stored in a standard pattern section 135, thus performing recognition processing. A data processor 136 receives the recognition result from the section 134. For example, when an equation such as "123 ×456" is input, the operation is performed in accordance with this equation, and the operation result is displayed on a display 137.

Figure 18:
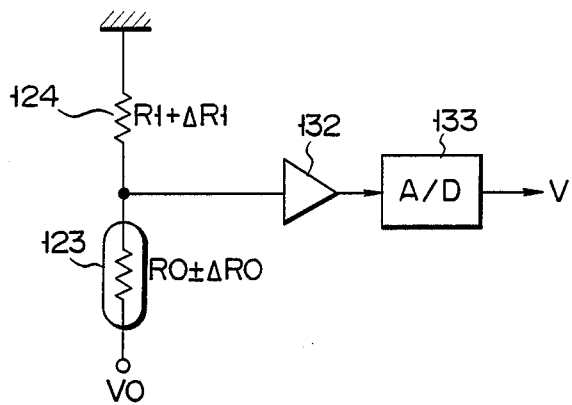
FIG. 18 is a view showing an electric circuit of FIG. 20.

The pressure sensitive operation of the fourth embodiment will be described with reference to FIG. 18. FIG. 18 is an equivalent circuit diagram of the semiconductor strain gauge 120. A voltage V0 is applied to the series-connected resistors 123 and 124 from the resistor 123 side, and the resistor 124 side is grounded. Assume that the resistance of the resistor 123 is given by R0, a variation in the resistance R0 is given by ΔR0, the resistance of the resistor 124 is given by R1, a variation in the resistance R1 is given by ΔR1, and a change in resistance due to the strain of the resistor 123 is given by ΓX. An output voltage V supplied from the node between the resistors 123 and 124 to the amplifier 132 is obtained by the following equation:

$$V = \{(R0 + \Delta R0 \pm \Gamma X)/(R0 + \Delta R0 + R1 + \Delta R1 \pm \Gamma X)\} \times V0 \quad \ldots(1)$$

Note that the change ΓX in resistance due to the strain of the resistor 123 is expressed as follows:

$$\Gamma X = (R0 + \Delta R0) \times Ks \times \epsilon \quad \ldots(2)$$

where Ks is a gauge ratio, and ε is a strain ratio. Therefore, as can be seen from equation (1), the resistor 124 compensates for the variation in resistance of the resistor 123 as a diffusion resistor, and a relative error becomes about 3% from the experimental result. For this reason, a change in resistance due to strain can be more precisely obtained.

Figure 19:
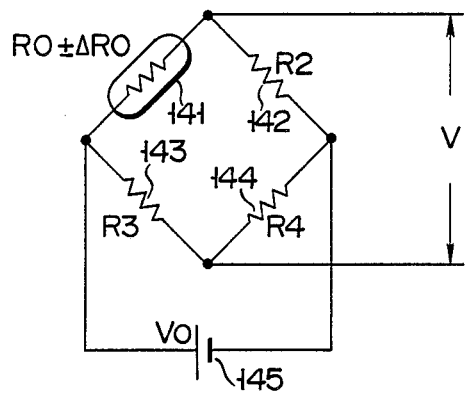
FIG. 19 is a view showing a modification of the electric circuit shown in FIG. 20.

FIG. 19 shows a modification of the circuit arrangement of the semiconductor strain gauge used as the piezoelectric element in the present invention. A bridge circuit is constituted by a single gauge resistor 141 and three dummy resistors 142 to 144, and a voltage V0 is applied to the bridge circuit from a power source 145.

In this modification, since the dummy resistors are connected to the gauge resistor in the same manner as in the embodiment shown in FIG. 18, a variation in resistance provided with the dummy resistor as a diffusion resistor can be compensated for.

As described above, according to the fourth embodiment of the present invention, since an error of resistance of a diffusion resistor can be relatively small, and a variation range of an output voltage can become sufficiently narrow, a semiconductor strain gauge which can perform more precise measurement can be used. Thus, a precise detection result required for a pen-type character recognition apparatus can be obtained.

What is claimed is:

1. A pen-type character recognition apparatus, comprising:
   a pen-shaped, hand-held size housing having a tip element for writing a character;
   a plurality of pressure detecting elements, which are associated with said tip element within said pen-shaped housing, for detecting pressure in accordance with at least x and y direction components perpendicular to an axis of said tip element, and for producing corresponding input character data;
   input data detecting means for detecting the input character data as data representative of a certain character according to a change in pressure applied to said tip element;
   said input data detecting means further including means for storing, in accordance with a change in one of the output signals from said plurality of pressure detecting elements, the output signal before changing as a reference signal; an operational amplifier for amplifying the output signals from said plurality of pressure detecting elements and for supplying the amplified output signals to said storing means, said operational amplifier having an inverting input and an output; a capacitor for supplying a bias voltage to said operational amplifier; means for supplying a handwriting input signal to said inverting input of said operational amplifier through said capacitor; a feedback resistor connected between said inverting input and said output of said operational amplifier through asid capacitor; and a switching element for short-circuiting between said inverting input and said output of said operational amplifier in synchronism with a predetermined timing signal so as to charge an offset voltage of said capacitor;
   electronic circuit means, coupled to said input data detecting means, for processing output data from said input data detecting means; and
   display means for displaying said certain character represented by the input character data;
   said input data detecting means, said electronic circuit means said display means being mounted in said pen-shaped, hand-held size housing;
   said electronic circuit means comprising:
   data processing means for standardizing output data from said input data detecting means, including means for compressing the output data to provide a predetermined number of data for said certain character;
   mode signating means for selecting at least a registration mode and a recognition mode;
   data registering means including first memory means for registering, in advance, selected standardized output data from sadi data processing means as standard pattern data for corresponding with the input character data when a character is written by said tip element, said output data from said data processing means being registered when said registration mode is selected by said mode designating means; and
   input character recognizing means including means for calculating a correlation value and a maximum correlation value between the output data from said data processing means and data registered in said data registering means, and for recognizing the character represented by the input character data in accordance with said maximum correlation value when said recognition mode is selected by said mode designating means.

2. An apparatus according to claim 1, wherein said data detecting means includes means for storing, in accordance with a change in one of the output signals from said plurality of pressure detecting elements, the output signal before changing as a reference signal; means for comparing the reference signal stored in said storing means and the output signals from said plurality of pressure detecting elements; and means for sampling the output signals from said plurality of pressure detecting elements only when a difference signal from said comparing means is present.

3. An apparatus according to claim 2, wherein said input data detecting means first includes first control means for causing said storing means to continue a storing operation thereof only when one of the output signals from said plurality of pressure detecting elements changes during a predetermined period of time.

4. An apparatus according to claim 1, wherein said data processing means includes second memory means for storing output data from said input data detecting means; means for reading out a preset number of data from data stored in said second memory means for said certain character in a redetermined sequence; and third memory means or storing the data read out by said readout means.

5. An apparatus according to claim 1, wherein said apparatus includes means for updating an address of said first memory means of said data registering means by operating a skip key, when the output data from said data processing means is stored in said first memory means with said apparatus being in said registration mode selected by said mode designating means.

6. An apparatus according to claim 1; wherein said apparatus includes correction designating means for selecting a correction operation of a recognition result from said input character recognizing means; and control means for instructing calculation of a second maximum correlation value excluding the immediately preceding maximum correlation value with respect to said input character recognizing means.

7. An apparatus according to claim 1, wherein each of said plurality of pressure detecting elements is a semiconductor strain gauge including a semiconductor substrate; a gauge resistor arranged on said semiconductor substrate in a first pressure sensitive direction and having a resistance changed in accordance with a strain; and a dummy resistor, arranged on said semiconductor substrate in a second pressure sensitive direction substantially perpendicular to the first pressure sensitive direction and connected to said gauge resistor, for compensating for the precision of the resistance of said gauge resistor.

8. An apparatus according to claim 1, including means for performing an arithmetic operation in accordance with numeral data and function data which are recognized by said input character recognizing means, and for displaying the result of the arithmetic operation on said display means.

9. A pen-type character recognition apparatus, comprising:
write means including a pen tip element having an axis, for producing input character data in response to a change in pressure applied to said tip element;
input data detecting means associated with said write means for detecting the input character data as data representative of a certain character according to changes in the pressure applied to said tip element;
data processing means for standardizing output data from said input data detecting means, including means for compressing the output data to a predetermined number of data for said certain character so as to generate corresponding standardized data;
data registering means for registering in advance selected standardized data as standard pattern data for corresponding with the input character data when a data character is written said write means; and
input character recognizing means for recognizing the character represented by the input character data produced by said write means, including means for comparing the standardized data generated from said data processing means with the data registered in advance in said data registering means;
wherein said input data detecting means includes
a plurality of pressure detecting elements associated with said pen tip element for detecting a pressure in accordance with at least x and y direction components perpendicular to the axis of said tip element of said pen;
means for storing, in accordance with a change in one of the output signals from said plurality of pressure detecting elements, the output signals before changing as a reference signal;
means for comparing the reference signal stored in said storing means and the output signals from said plurality of pressure detecting elements;
means for sampling the output signals from said plurality of pressure detecting elements only when a difference signal from said comparing means is present;
an operational amplifier for amplifying the output signals from said plurality of pressure detecting elements and for supplying the amplified output signals to said storing means;
a capacitor for supplying a bias voltage to said operational amplifier;
means for supplying a handwriting input signal to an inverting input terminal of said operational amplifier through said capacitor;
a feedback resistor connected between the inverting input terminal and an output terminal of said operational amplifier through said capacitor; and
a switching element for short-circuiting between the inverting input terminal and the output terminal of said operational amplifier in synchronism with a predetermined timing signal so as to charge an offset voltage on said capacitor.

* * * * *